United States Patent
Hamada et al.

[11] Patent Number: 5,938,307
[45] Date of Patent: *Aug. 17, 1999

[54] PROJECTION DISPLAY APPARATUS USING LIQUID CRYSTAL LIGHT BULB

[75] Inventors: Tetsuya Hamada; Toshihiro Suzuki; Takeshi Gotoh; Keiji Hayashi, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/593,229

[22] Filed: Jan. 29, 1996

[30] Foreign Application Priority Data

Aug. 18, 1995 [JP] Japan ................................ 7-210683

[51] Int. Cl.⁶ ............................................. G03B 21/14
[52] U.S. Cl. ....................................... 353/38; 353/81
[58] Field of Search ............................ 353/38, 102, 31, 353/33, 81; 349/5, 7

[56] References Cited

U.S. PATENT DOCUMENTS

| | | | |
|---|---|---|---|
| 5,005,968 | 4/1991 | Tejima et al. | 353/38 |
| 5,418,583 | 5/1995 | Masumoto | 353/38 |
| 5,438,379 | 8/1995 | Kurematsu | 353/102 |
| 5,467,207 | 11/1995 | Forkuer et al. | 353/38 |

FOREIGN PATENT DOCUMENTS

| | | |
|---|---|---|
| 1-283510 | 11/1989 | Japan . |
| 3-54593 | 3/1991 | Japan . |
| 3-54594 | 3/1991 | Japan . |
| 6-51401 | 2/1994 | Japan . |

Primary Examiner—William C. Dowling
Attorney, Agent, or Firm—Greer, Burn & Crain Ltd.

[57] ABSTRACT

A projection display apparatus includes a light source unit for emitting light, a modulation unit for spatially modulating the light from the light source unit, and a projection lens for projecting light spatially modulated by the modulation unit on a screen so that a picture corresponding to spatial modulation in the modulation unit is formed on the screen. A deflection unit is located between the light source and the modulation unit and deflecting beams are included in the light from the light source unit toward an optical axis to prevent the beams from traveling out of the modulation unit.

9 Claims, 14 Drawing Sheets

| | CONVENTIONAL CASE | EMBODIMENT | EFFECT |
|---|---|---|---|
| ILLUMINANCE AT CENTER (5) | 1687 Lx | 1864 Lx | 1.10 TIMES |
| ILLUMINANCE IN FRINGE (AVERAGE OF (1)-(4) & (6)-(9)) | 849 Lx | 1082 Lx | 1.27 TIMES |
| ILLUMINANCE AT CORNERS (AVERAGE OF (10)-(13)) | 468 Lx | 588 Lx | 1.26 TIMES |

PROJECTION DISPLAY APPARATUS USING LIQUID CRYSTAL LIGHT BULB

BACKGROUND OF THE INVENTION

(1) Field of the Invention

The present invention generally relates to a projection display apparatus and more particularly to a projection display apparatus using a liquid crystal light bulb.

(2) Description of the Related Art

It is preferable that a picture projected on a screen by a projection display unit is as bright as possible and the whole surface of the picture has a uniform brightness.

A conventional projection display apparatus is shown in FIG. 1. Referring to FIG. 1, a projection display apparatus 10 has a light source unit 12, a concentrator lens 13, a liquid crystal light bulb 14 and a projection lens 15. The light source unit 12 is formed of a metal halide lamp 12a (250 watts) and a parabolic reflector 12b. The liquid crystal light bulb 14 is a rectangular plate having a diagonal dimension of 3.2 inches. The liquid crystal light bulb 14 forms a picture thereon. Projection light 16 from the light source unit 12 is concentrated on the liquid crystal light bulb 14 by the concentrator lens 13. The projection light 16 is specially modulated by the picture formed on the liquid crystal light bulb 14. A projection light 16A which is spatially modulated passes through the projection lens 15 and is projected on a screen 20. As a result, an enlarged picture 21 is displayed on the screen 20.

The light source unit 12 has a structure in which the metal halide lamp 12a is surrounded by the parabolic reflector 12b. Thus, an illuminance distribution in which an illuminance decreases at positions displaced from an optical axis 11 is formed on the liquid crystal light bulb 14. Further, the transmittance of the projection lens 15 decreases at positions displaced from the optical axis 11. As a result, in the illuminance distribution of the picture 21 on the screen 20, as indicated by a curve I in FIG. 1, an illuminance in a fringe area of the picture 21 is approximately half as bright as an illuminance in a center area of the picture 21. Thus, the picture 21 on the screen does not have a high quality.

SUMMARY OF THE INVENTION

Accordingly, a general object of the present invention is to provide a novel and useful projection display apparatus in which the disadvantages of the above mentioned prior art are eliminated.

A more specific object of the present invention is to provide a projection display apparatus which can form a high quality picture on the screen.

The above objects of the present invention are achieved by a projection display apparatus comprising: a light source unit for emitting light; a modulation member for spatially modulating the light incident thereon from said light source unit; a projection lens for projecting light spatially modulated by said modulation member on a screen so that a picture corresponding to spatial modulation in said modulation member is formed on said screen; and a deflection member, located between said light source and said modulation member, deflecting beams included in the light from said light source unit toward an optical axis to prevent the beams from traveling out of said modulation member.

According to the present invention, to prevent the beams from traveling out of the modulation member (e.g. the liquid crystal light bulb), the beams are deflected by the deflection member toward the optical axis. As a result, the amount of light incident on the modulation member is increased, so that the brightness of a picture projected on the screen is increased. In addition, the illuminance on a fringe portion of the modulation member is increased, so that uniformity of the brightness of a picture projected on the screen is improved.

Thus, a picture having a high quality is projected on the screen.

BRIEF DESCRIPTION OF THE DRAWINGS

Other objects, features and advantages of the present invention will be apparent from the following detailed description when read in conjunction with the accompanying drawings, in which.

DESCRIPTION OF THE PREFERRED EMBODIMENTS

A description will now be given of embodiments of the present invention.

Figure 1:
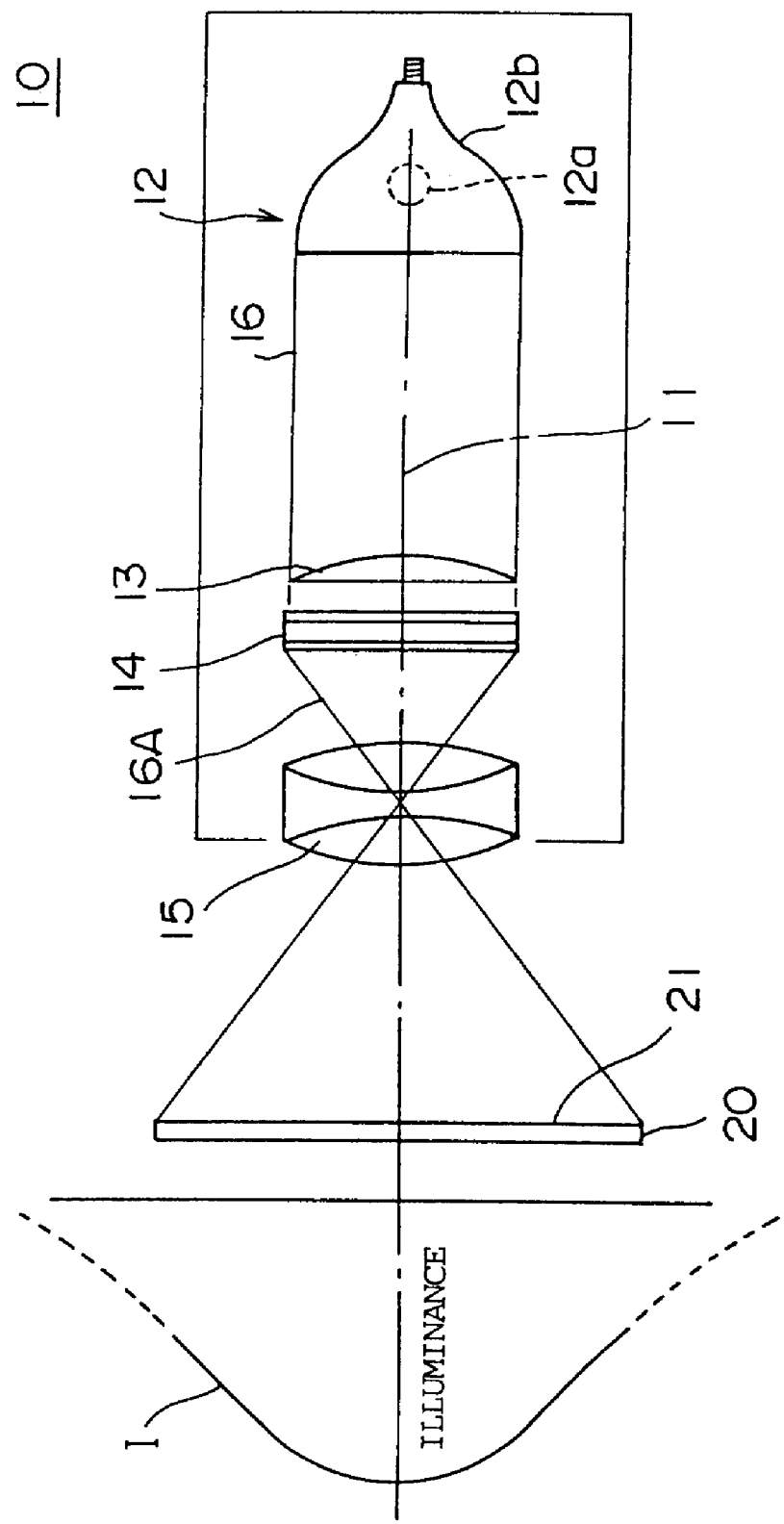
FIG. 1 is a diagram illustrating a conventional projection display apparatus.
Figure 2:
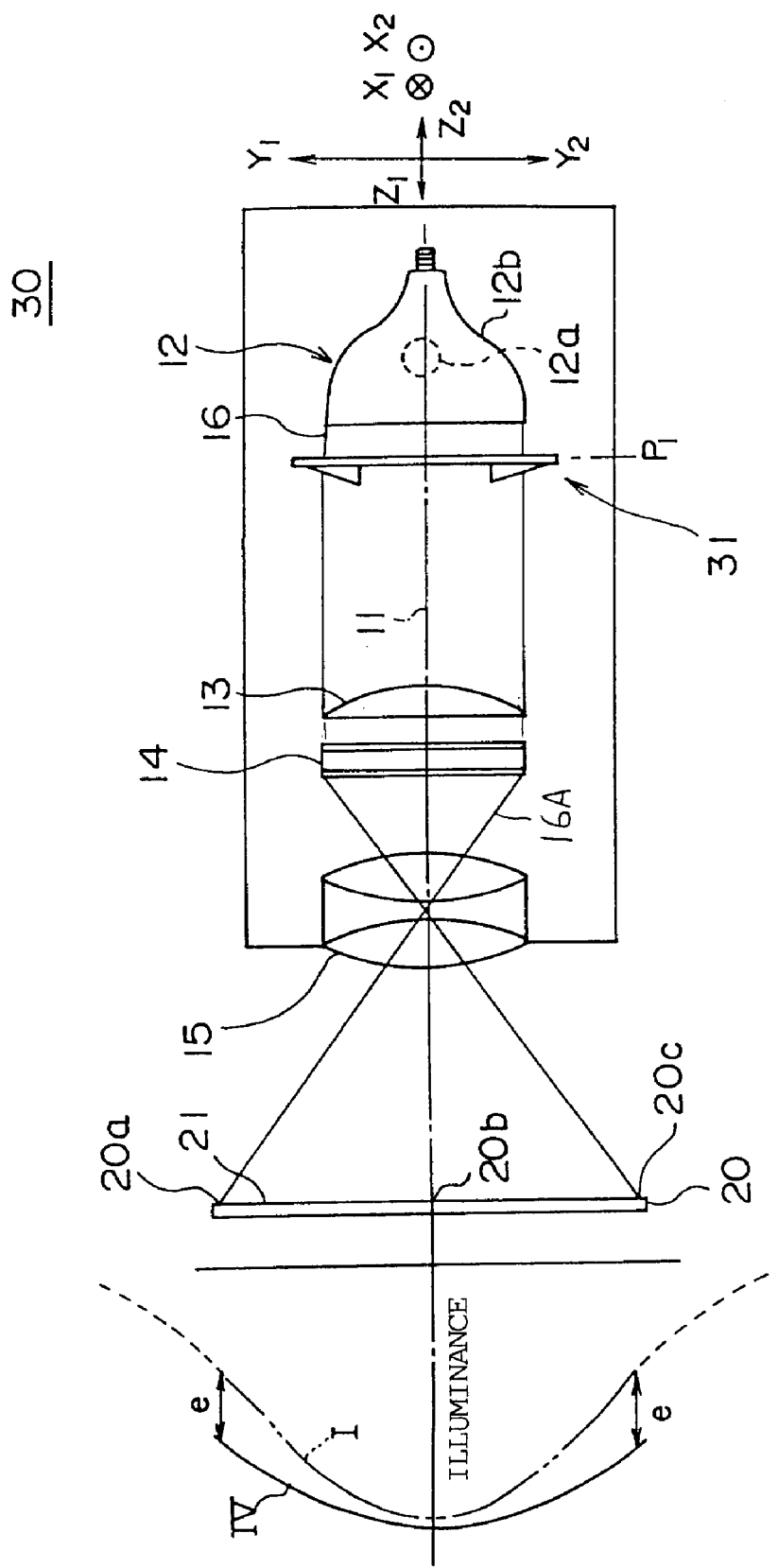
FIG. 2 is a diagram illustrating a projection display apparatus according to a first embodiment of the present invention.

A projection display apparatus according to a first embodiment of the present invention is formed as shown in FIG. 2. In FIG. 2, those parts which are the same as those shown in FIG. 1 are given the same reference numbers.

Referring to FIG. 2, a projection display apparatus 30 has the light source unit 12 (having the metal halide lamp 12a and the parabolic reflector 12b), the concentrator lens 13, the liquid crystal light bulb 14 (which is the rectangular plate having the diagonal dimension of 3.2 inches) and the projection lens 15 in the same manner as that shown in FIG. 1. The projection display apparatus 30 further has a wedge prism assembly 31 in front of the light source unit 12. The projection light 16 from the light source unit 12 travels through the wedge prism assembly 31 to the concentrator lens 13. The projection light 16 is concentrated on the liquid crystal light bulb 14 and is specially modulated by a picture formed on the liquid crystal light bulb 14. The projection light 16A which is specially modulated passes through the projection lens 15 and is projected on the screen 20, so that an enlarged picture 21 is displayed on the screen 20.

Figure 3:
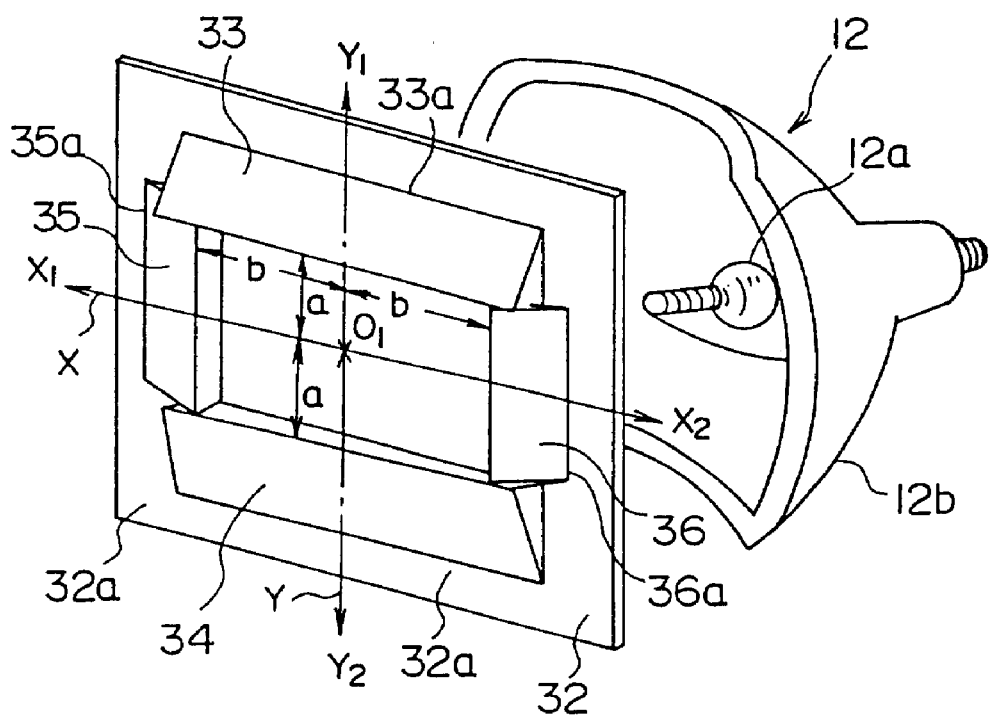
FIG. 3 is a perspective view showing a wedge prism assembly and a light source unit in projection display apparatus shown in FIG. 2.

The wedge prism assembly 31 is formed as shown in FIG. 3. Referring to FIG. 3, the wedge prism assembly 31 has a glass plate 32 and four wedge prisms 33 through 36. The wedge prisms 33 though 36 are fixed on a surface 32a of the glass plate 32 which is opposite to a surface facing the light source unit 12. It is preferable that the wedge prisms 33 through 36 are fixed using metallic parts. When the projection display apparatus 30 is actually used, the wedge prism assembly 31 may be at a temperature greater than 100° C. Thus, if the wedge prisms 33 through 36 are adhered to the glass plate 32 using an adhesive, the reliability of the adhesive deteriorates during use of the projection display apparatus 30.

Figure 5:
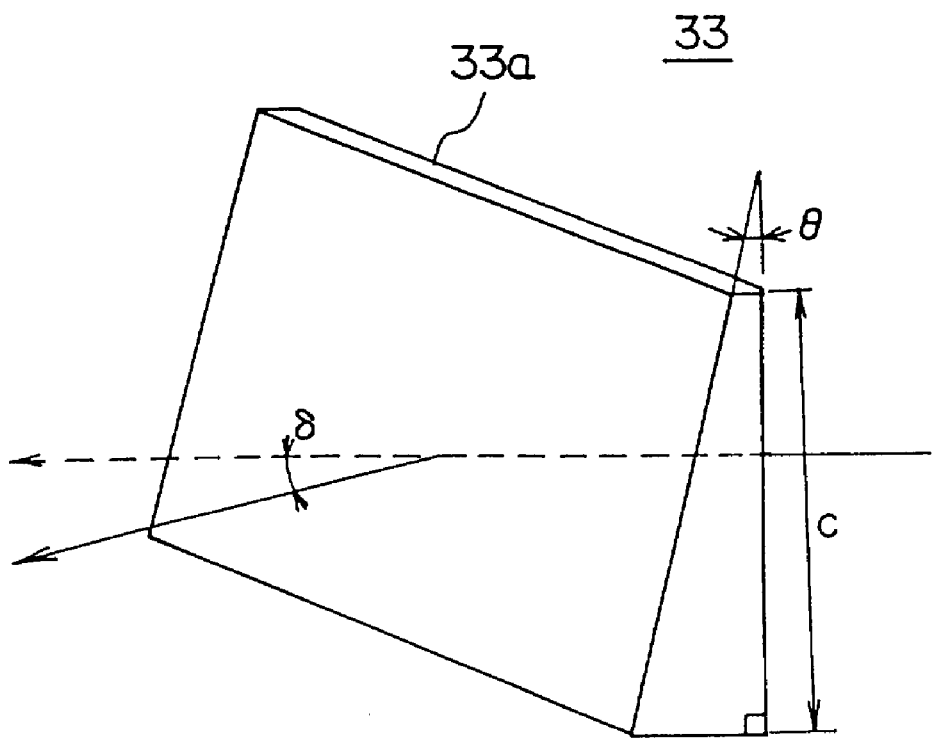
FIG. 5 is a diagram illustrating the enlarged wedge prism.

The glass plate 32 is on an X-Y plane through which the optical axis 11 perpendicularly passes at a point O1. Each of the wedge prisms 33 through 36 has a width c and a vertical angle $\theta$ of about 9 degrees, as shown in FIG. 5. The wedge prisms 33 though 36 are arranged so as to be a rectangular frame corresponding to the shape of the liquid crystal light bulb 14. That is, the wedge prisms 33 and 34 are respectively at a distance a from the point O1 in opposite directions and parallel to the X-axis, and the wedge prisms 35 and 36 are respectively at a distance b from the point O1 in opposite directions and parallel to the Y-axis. The vertical portions 33a through 36a of the wedge prisms 33 through 36 face the outside of the rectangular frame formed thereof.

Figure 4A:
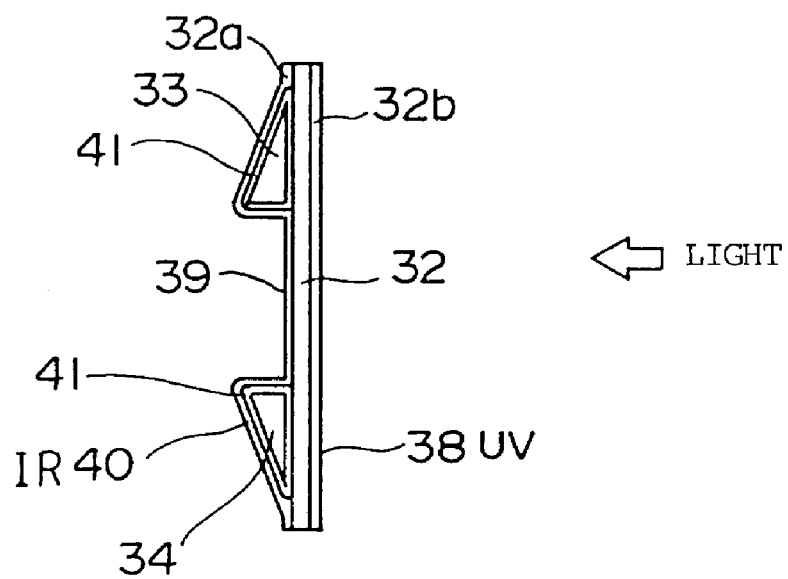
FIGS. 4A and 4B are diagrams illustrating a detailed structure of the wedge prism assembly.
Figure 4B:
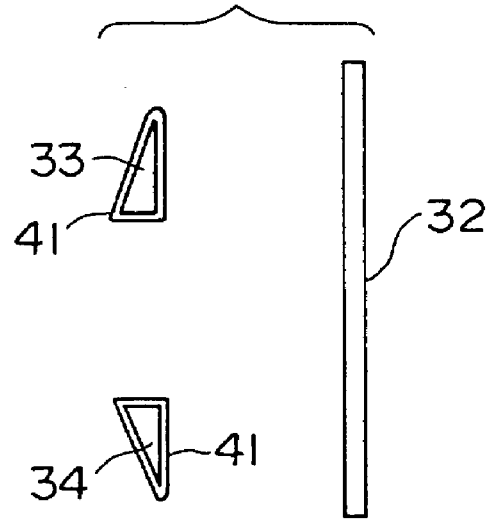

In addition, a detailed structure of the wedge prism assembly 32 is shown in FIGS. 4A and 4B. A surface 32b of the glass 32 opposite to the surface 32 on which the wedge prisms 33 through 36 are fixed is covered with a UV (Ultraviolet)-shield film 38. Each of the wedge prisms 33 through 36 are covered with an antireflection film 41 as shown in FIG. 4B. Surfaces of the wedge prisms 33 through 36 are covered with the antireflection films 41 and the surface 32a of the glass plate 32 is covered with an IR (Infrared)-shield film 41 as shown in FIG. 4A. Even when air bubbles are formed in a boundary between each of the wedge prisms 33 through 36 and the glass plate 32, the antireflection film 41 prevents the projection light 16 from the light source unit 12 from occurring diffused reflection in the boundary. Thus, the brightness of a picture 21 on the screen can be improved as will be described later.

The wedge prism assembly 32 is perpendicular to the optical axis 11 and is located at a position P1 in front of the parabolic reflector 12b of the light source unit 12. Light beams reflected by a fringe area of the parabolic reflector 12b pass through the wedge prisms 33 through 36.

Figure 6A:
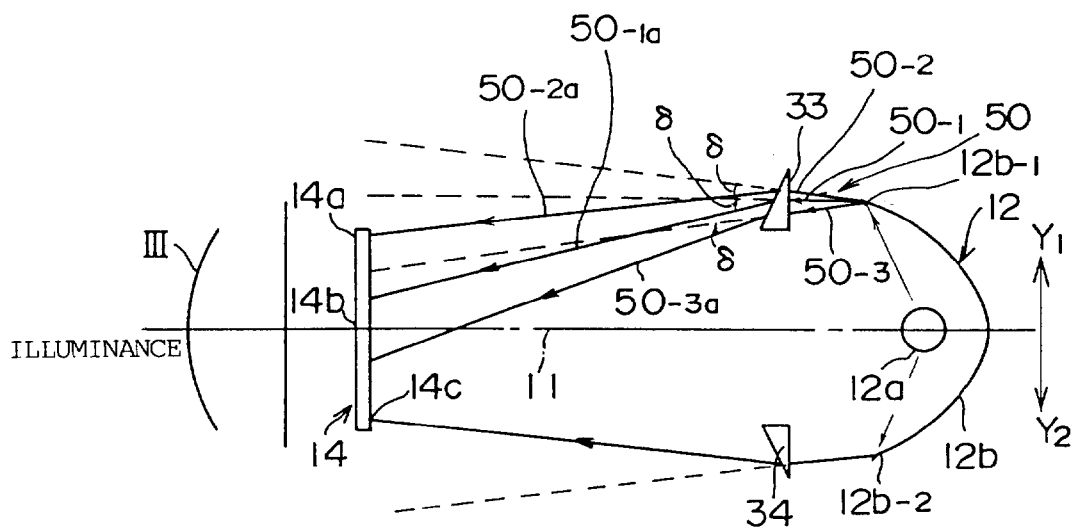
FIG. 6A is a diagram illustrating light beams traveling in the projection display apparatus according to the first embodiment.
Figure 6B:
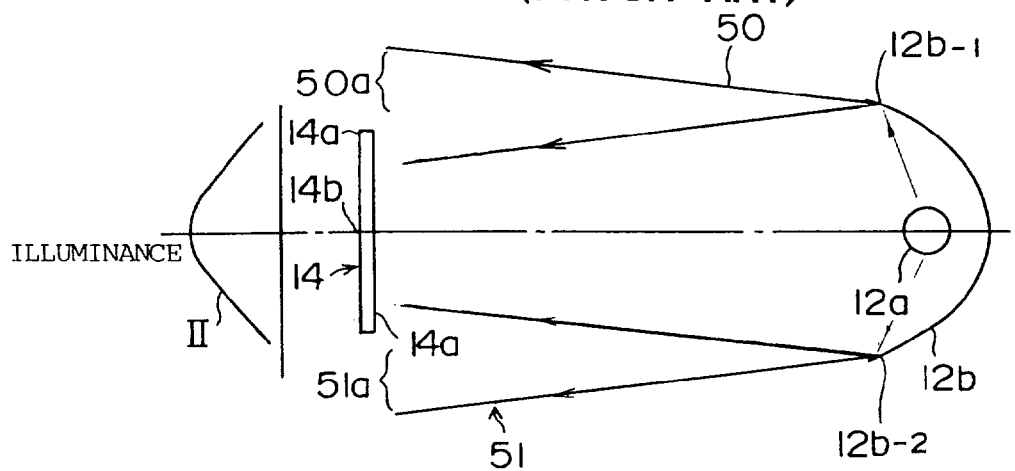
FIG. 6B is a diagram illustrating light beams traveling in the conventional projection display apparatus.

A description will now given, with reference to FIGS. 6A and 6B, of a function of the wedge prism assembly 31. In FIGS. 6A and 6B, the concentrator lens 13 is omitted, and light beams traveling in the projection display apparatus are exaggeratingly shown.

As shown in FIG. 6A, the wedge prism assembly 31 is useful for light beams which are reflected by a fringe area 12b-1 (12b-2) of the parabolic reflector 12b and travel toward the liquid crystal light bulb 14.

Since the metal halide lamp 12a is not a complete point source, as shown in FIG. 6B, light beams 50 and 51 which are reflected by the fringe area 12b-1 (12b-2) are slightly diverged. In the conventional projection display device 10 shown in FIG. 1, a part 50a of the light beam 50 and a part 51a of the light beam 51 travels toward the outside of the liquid crystal light bulb 14 so as to not be projected on the liquid crystal light bulb, as shown in FIG. 6B. Thus, due to the parts 50a and 51a of the light beams 50 and 51, the illuminance on a fringe area of the liquid crystal light bulb 14 decreases. That is, the illuminance distribution on the liquid crystal light bulb 14 is formed as shown by a curve II in FIG. 6B. As a result, in the conventional projection display apparatus, the illuminance distribution in which the illuminance on the fringe area of the picture 21 is approximately half as large as the illuminance on the center portion of the picture 21, as shown by the curve I in FIG. 1.

On the other hand, in the projection display apparatus 30 according to the first embodiment, as shown in FIG. 6A, light 50 reflected by the fringe area 12b-1 of the parabolic reflector 12b is incident on the wedge prism 33 and refracted by the wedge prism 33 toward the optical axis 11.

In this case, for example, three light beams 50-1, 50-2 and 50-3 included in the light 50 reflected by the fringe area 12b-1 of the parabolic reflector 12b travel as follows.

The light beam 50-1 is located in the center of the light 50. The light beam 50-2 travels obliquely upward from the parabolic reflector 12b, and the light beam 50-3 travels obliquely downward from the parabolic reflector 12b. When the light beams 50-1, 50-2 and 50-3 are incident on the wedge prism 33, the light beams 50-1, 50-2 and 50-3 are deflected at an angle $\delta$ by the wedge prism 33 (the same angle of deflection). The light beams 50-1, 50-2 and 50-3 are deflected by the wedge prism 33, so that corresponding light beams 50-1a, 50-2a and 50-3a travel toward the liquid crystal light bulb 14.

The light beam 50-2a travels toward an area including an upper edge 14a of the liquid crystal light bulb 14 and is projected on the area. The light beams 50-1a and 50-3a travel toward an area including the center 14b of the liquid crystal light bulb 14 and are projected on the area. That is, the light 50a which is useless to irradiate the liquid crystal light bulb 14 in the conventional projection display apparatus 10 is projected on the area including the upper edge 14a of the liquid crystal light bulb 14.

Also, the light 51a which is diverged from the fringe area 12b-2 of the parabolic reflector 12b and is useless to irradiate the liquid crystal light bulb 14 in the conventional projection display apparatus 10 is projected on an area including a lower edge 14c of the liquid crystal light bulb 14.

Accordingly, the illuminance distribution as shown by a curve III in FIG. 6A is formed on the liquid crystal light bulb 14. The illuminance distribution as shown by the curve III in FIG. 6A would be obtained as follows.

Figure 7:
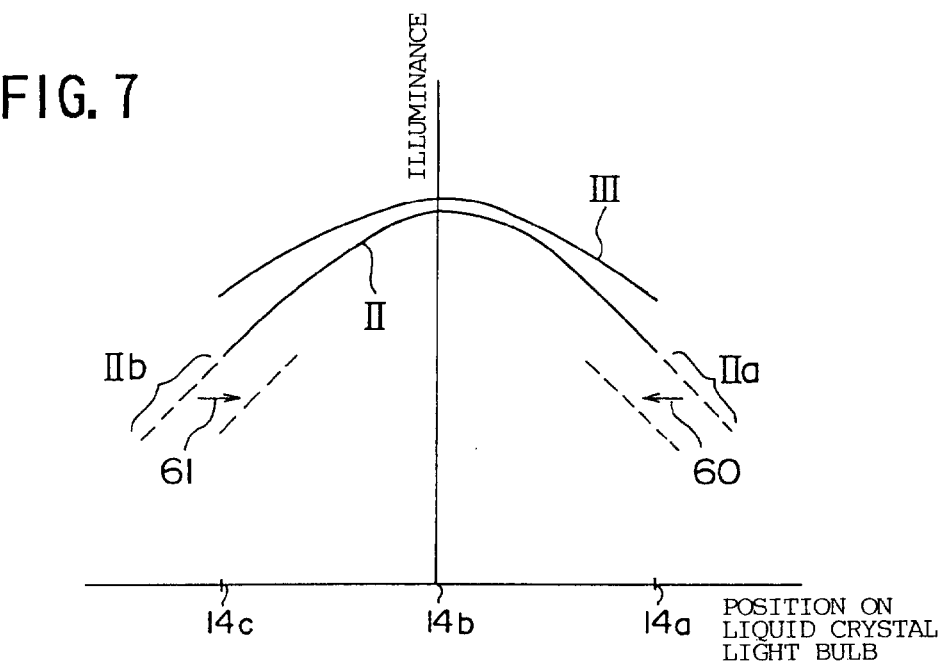
FIG. 7 is a diagram illustrating an illuminance distribution on the liquid crystal light bulb in the projection display apparatus shown in FIG. 2.

As shown in FIG. 7, parts IIa and IIb of the curve II which represents the illuminance distribution in the conventional case correspond to the light 50a and 51a traveling out of the upper and lower edges 14a and 14c of the liquid crystal light bulb 14. The parts IIa and IIb are moved toward the center 14b of the liquid crystal light bulb 14 and added to the curve II as shown by arrows 60 and 61 in FIG. 7. As a result, the illuminance on the fringe area of the liquid crystal light bulb 14 is increased, so that the illuminance distribution curve III is obtained.

The wedge prisms 35 and 36 operate in the same manner as the wedge prisms 33 and 34. That is, the light diverged in the directions X1 and X2 is deflected by the wedge prisms 35 and 36, so as to be projected on the liquid crystal light bulb 14.

In the projection display apparatus 30 shown in FIG. 2, the light passing through the liquid crystal light bulb 14 travels through the projection lens 15 and is projected on the screen 20. The illuminance distribution of the picture 21 on the screen 20 corresponds to the illuminance distribution formed on the liquid crystal light bulb 14. That is, the illuminance distribution of the picture 21 on the screen 20 is formed as shown by a curve IV in FIG. 2.

Figure 8:
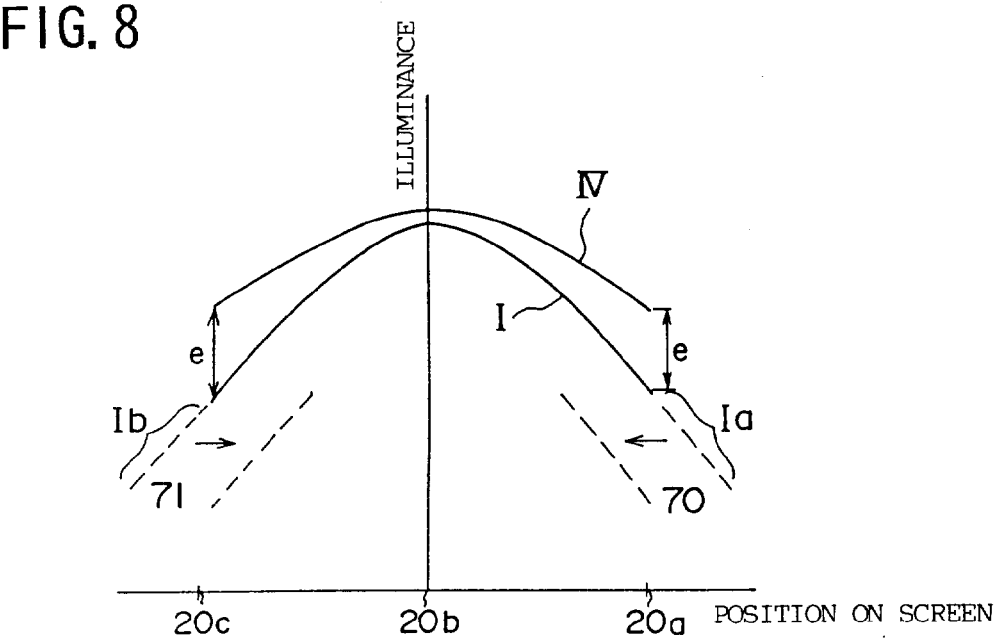
FIG. 8 is a diagram illustrating an illuminance distribution on the screen on which a picture is projected by the projection display apparatus.

As shown in FIG. 8, parts Ia and Ib of the curve I which represents the illuminance distribution in the conventional case correspond to the light traveling out of the edges 20a and 20c of the screen 20. The parts Ia and Ib are moved toward the center 20b of the screen 20 and added to the curve I as shown by arrows 70 and 71 in FIG. 8. As a result, the illuminance on the fringe area of the screen 20 is increased by e, so that the illuminance distribution curve IV is obtained.

Thus, the picture 21 having a high quality is projected on the screen 20.

The wedge prism assembly 31 is provided with the UV-shield film 38 and the IR-shield film 40 as shown in FIGS. 4A and 4B. The UV-shield film 38 and the IR-shield film 40 respectively interrupt ultraviolet (UV) and the infrared (IR) from the metal halide lamp 12a so as to prevent the ultraviolet and the infrared from affecting the liquid crystal light bulb 14.

In the wedge prism assembly 31, the surface 32a of the glass plate 32 facing the metal halide lamp 12a is covered with the UV-shield film 38 (see FIG. 4A). The ultraviolet from the metal halide lamp 12a is absorbed by the UV-shield film 38 before entering the glass plate 32. Thus, increase of the temperature of the glass plate 32 caused by the ultraviolet from the metal halide lamp 12a is limited. As a result, the glass plate 32 is prevented from mechanically deteriorating.

In general, when ultraviolet is obliquely incident on a UV-shield film (the incident angle is not zero), the function of the UV-shield film deteriorates. However, in the projection display apparatus according to the first embodiment of the present invention, the ultraviolet from the metal halide lamp 12a is perpendicularly incident on the UV-shield film 38 with which the surface 32a of the glass plate 32 (the incident angle is zero) is covered. Thus, the ultraviolet from the metal halide lamp 12a can effectively be interrupted by the UV-shield film 38.

In addition, since wedge prism assembly 31 is provided with the UV-shield film 38 and the IR-shield film 40, it is not necessary to separately mount a UV-shield filter and an IR-shield filter in the projection display apparatus. That is, the structure of the projection display apparatus can be simplified in comparison with the conventional apparatus.

In the wedge prism assembly 31, the wedge prisms 33 through 36 are arranged so as to form the rectangular frame and are fixed on the glass plate 32. That is, the four wedge prisms 33 through 36 are integrated with each other on the glass plate 32. Thus, the four wedge prisms 33 through 36 can be accurately adjusted with respect to the light emitted from the light source unit 12.

A description will now be given of a second embodiment of the present invention.

Figure 9:
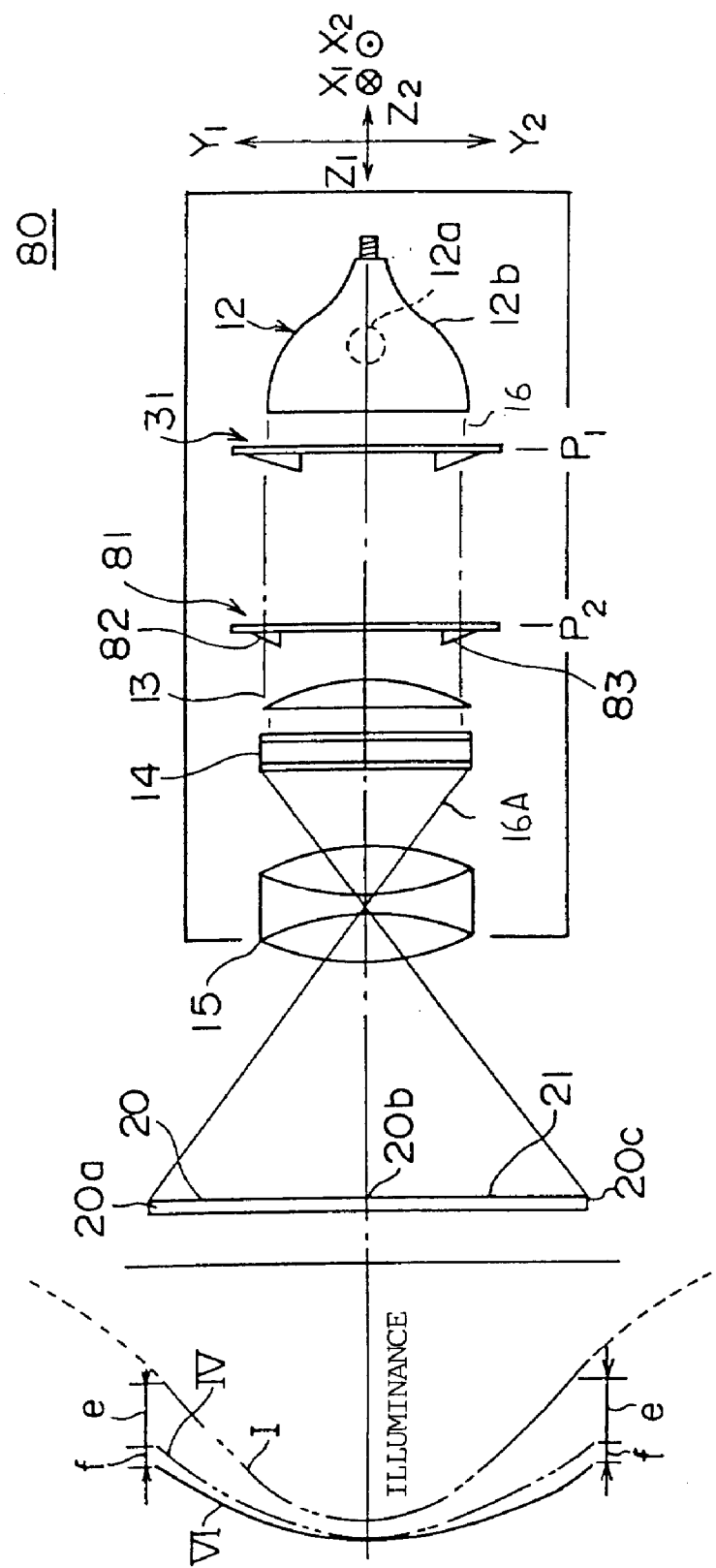
FIG. 9 is a diagram illustrating a projection display apparatus according to a second embodiment of the present invention.

The projection display apparatus according to the second embodiment of the present invention is formed as shown in FIG. 9. In FIG. 9, those parts which are the same as those shown in FIG. 2 are given the same reference numbers.

Referring to FIG. 9, the projection display apparatus 80 has the light source unit 12, the wedge prism assembly 31, the concentrator lens 13, the liquid crystal light bulb 14 and the projection lens 15 in the same manner as that of the first embodiment shown in FIG. 1. The projection display apparatus 80 further has another wedge prism assembly 81. The wedge prism assembly 31 is referred to as a first wedge prism assembly 31, and the added wedge prism assembly 81 is referred as a second wedge prism assembly 81.

Figure 10:
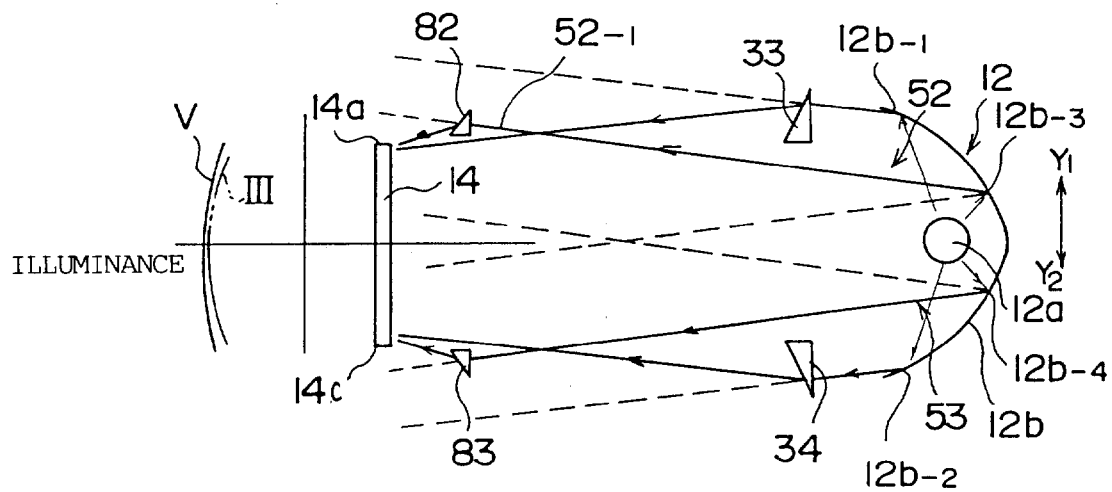
FIG. 10 is a diagram illustrating light beams in the projection display apparatus shown in FIG. 9.
Figure 11:
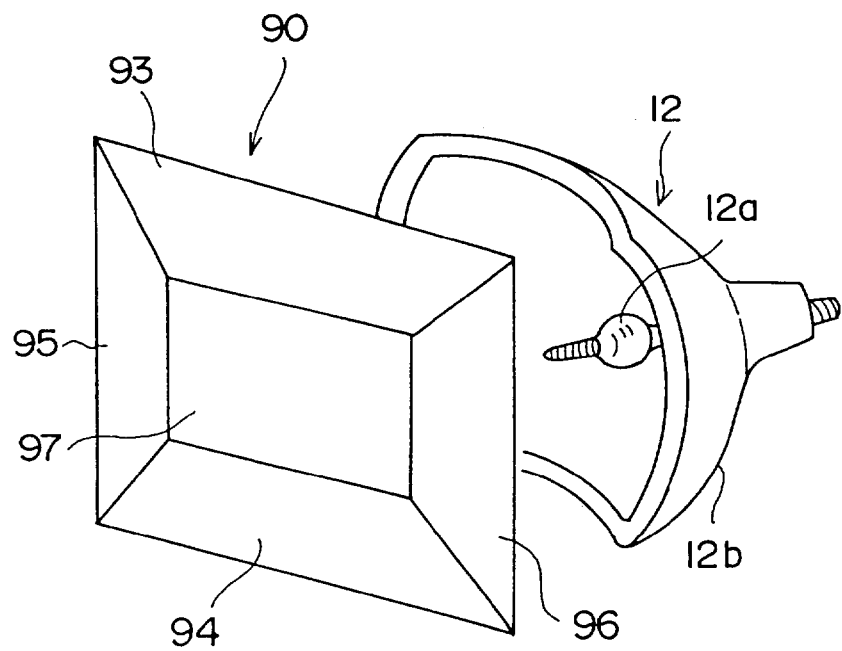
FIG. 11 is a perspective view showing a wedge prism assembly and a light source which may be used in the projection display apparatus shown in FIG. 9.
Figure 12:
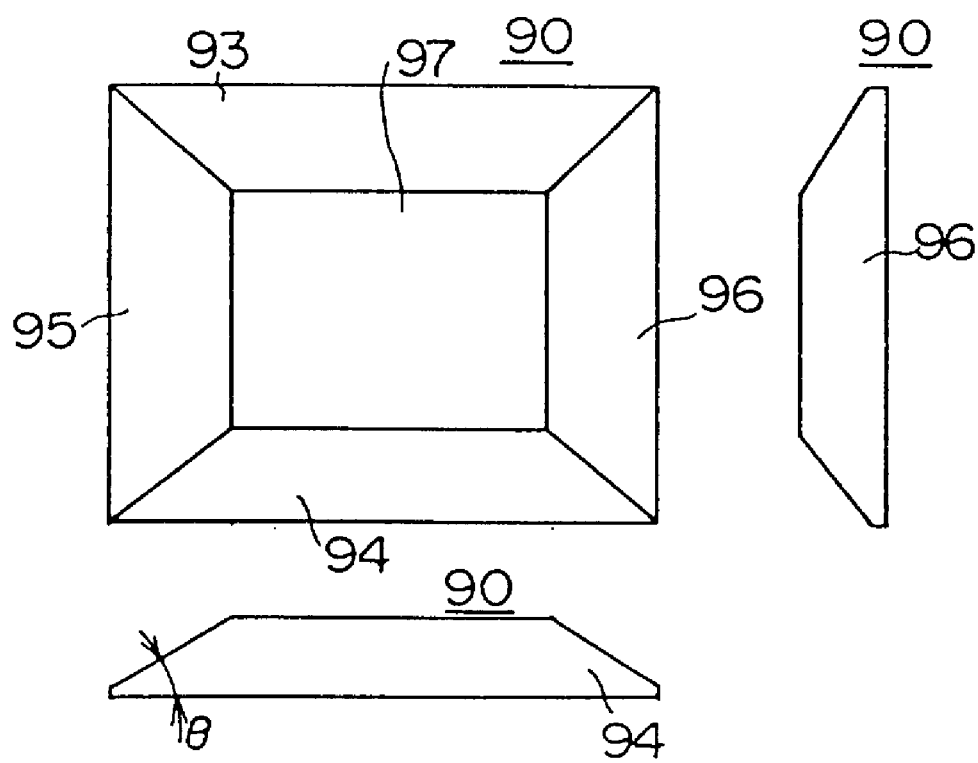
FIGS. 12A through 12C are diagrams illustrating a detailed structure of the wedge prism assembly show in FIG. 11.

The second wedge prism assembly 81 has the same structure as the first wedge prism assembly 31 shown in FIGS. 3 though 5. The second wedge prism assembly 81 is located at a position P2 near the concentrator lens 13 between the first wedge prism assembly 31 and the concentrator lens 13. The second wedge prism assembly 81 has four wedge prisms (including wedge prisms numbered 82 and 83 as shown in FIG. 10) corresponding to the wedge prisms 33 though 36 of the first wedge assembly 31. The second wedge prism assembly 81 is arranged so that the wedge prisms 82 and 83 receives light beams which are reflected by portions of the parabolic reflector 12b near the center thereof and travel toward the outside of the upper and lower edges 14a and 14c of the liquid crystal light bulb 14.

As shown in FIG. 10, light 52 is reflected by and diverged from a portion 12b-3 of the parabolic reflector 12b. Light 52-1 which is a part of the light 52 travels toward the outside of the upper edge 14a of the liquid crystal light bulb 14. The wedge prism 82 deflects the light 52-1 so that the light 52-1 is projected on an area inside the upper edge 14a of the liquid crystal light bulb 14. In addition, light 53 is reflected by and diverged from a portion 12b-4 of the parabolic reflector 12b. Light 53-1 which is part of the light 53 travels toward the outside of the lower edge 14c of the liquid crystal light bulb 14. The wedge prism 83 deflects the light 53-1 so that the light 53-1 is projected on an area inside the lower edge 14c of the liquid crystal light bulb 14.

Accordingly, in the illuminance distribution formed on the liquid crystal light bulb 14 as shown by a curve V in FIG. 10, the illuminance on areas near the upper and lower edges 14a and 14b of the liquid crystal light bulb 14 is further increased. Thus, in the illuminance distribution of the picture 21 on the screen 20 as shown by a curve VI in FIG. 9, the illuminance on fringe areas near the edges 20a and 20c of the picture 21 is increased by f. As a result, the picture 21 having a higher quality is projected on the screen 20, in comparison with the case shown in FIG. 2.

FIGS. 11 and 12A through 12C show a variation of the wedge prism assembly.

Referring to FIGS. 11 and 12A through 12C, four fringe portions of a rectangular glass plate having a predetermined thickness are obliquely cut so that a wedge prism assembly 90 having a trapezoidal cross section is formed. Thus, four wedge prisms 93 through 96 corresponding to the wedge prisms 33 though 36 of the wedge prism assembly 31 shown in FIG. 3 are integrated into the wedge prism assembly 90. The wedge prism assembly 90 is integrally made of glass or resin. The glass is thermally superior to the resin. A center portion of the wedge prism assembly 90 is a rectangular plate area 97 having surfaces parallel to each other.

The wedge prism assembly 90 can be accurately made with low cost in comparison with the wedge prism assembly 31 shown in FIG. 3. The wedge prism assembly 90 is provided with the UV-shield film, the IR-shield film and antireflection film in the same manner as the wedge prism assembly 31 shown in FIGS. 4A and 4B.

A description will now be given of a third embodiment of the present invention.

Figure 13:
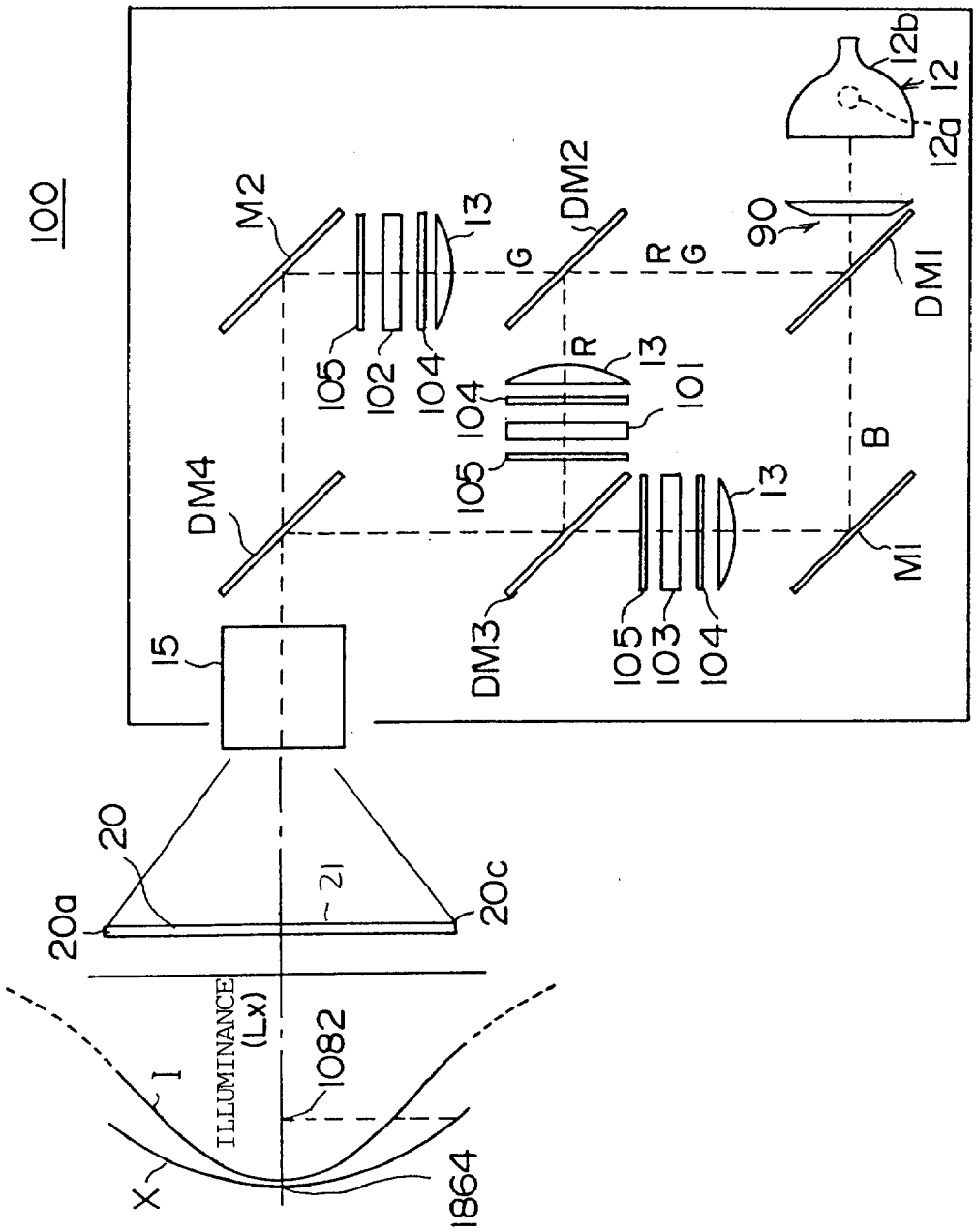
FIG. 13 is a diagram illustrating a projection display apparatus according to a third embodiment of the present invention.

A projection display apparatus according to the third embodiment is formed as shown in FIG. 13. In FIG. 13, those parts which are the same as those shown in FIG. 2 are given the same reference numbers.

Referring to FIG. 13, the projection display apparatus 100 has first, second, third and fourth dichroic mirrors DM1 through DM4 and mirrors M1 and M2. The first dichroic mirror DM1 reflects only green and red components (G-light and R-light) of light. The second dichroic mirrors DM2 and DM3 reflect only the red component (the R-light) of light. The fourth dichroic mirror DM4 reflects only blue and red components (B-light and R-light) of light.

The wedge prism assembly 90 having the structure shown in FIGS. 11 and 12A through 12C is located between the light source unit 12 (including the metal halide lamp 12a and the parabolic reflector 12b) and the first dichroic mirror DM1. The white light emitted from the metal halide lamp 12a of the light source unit 12 travels through the wedge prism assembly 90 to the first dichroic mirror DM1. Only the G-light and the R-light are reflected by the first dichroic mirror DM1 so that the white light is divided into the B-light and the light including the R-light and the G-light. The B-light travels to the mirror M1 and the light including the R-light and the G-light travels to the second dichroic mirror DM2. The dichroic mirror DM2 reflects only the R-light of the incident light so that the incident light is divided into the R-light and the G-light. That is, the white light emitted from the light source unit 12 is divided into the R-light, the G-light and the B-light by using the first and second dichroic mirrors DM1 and DM2.

The R-light reflected by the second dichroic mirror DM2 travels toward the third dichroic mirror DM3. The concentrator mirror 13, polarizing plates 104 and 105 and a first liquid crystal light bulb 101 are located between the second and third dichroic mirrors DM2 and DM3. The R-light passes through the concentrator mirror 13, the polarizing plate 104, the first liquid crystal light bulb 101 and the polarizing plate 105, so that the B-light is spatially modulated by a picture formed on the first liquid crystal light bulb 101. The spatially modulated B-light is then reflected by the third dichroic mirror DM3.

The G-light passing through the second dichroic mirror DM2 travels toward the mirror M2. The concentrator mirror 13, the polarizing plates 104 and 105 and a second liquid crystal light bulb 102 are located between the second dichroic mirror DM2 and the mirror M2. The G-light passes through the concentrator mirror 13, the polarizing plate 104, the second liquid crystal light bulb 102 and the polarizing plate 105, so that the G-light is spatially modulated by a picture formed on the second liquid crystal light bulb 102. The spatially modulated G-light is then reflected by the mirror M2.

The mirror M1 reflects the B-light incident thereon, and the B-light travels toward the third dichroic mirror DM3. The concentrator lens 13, polarizing plates 104 and 105 and a third liquid crystal light bulb 103 are located between the M1 and the third dichroic mirror DM3. The B-light reflected by the mirror M1 passes through the concentrator lens 13, the polarizing plate 104, the third liquid crystal light bulb 103 and the polarizing plate 105, so that the B-light is spatially modulated by a picture formed on the third liquid crystal light bulb 103. The spatially modulated B-light then passes through the third dichroic mirror MD3.

The R-light and the B-light both of which are spatially modulated are superposed on each other by the third dichroic mirror DM3. The light composed of the R-light and the B-light is reflected by the fourth dichroic mirror DM4. The G-light which is spatially modulated and reflected by the mirror M2 passes through the fourth dichroic mirror DM4. As a result, the R-light, the G-light and B-light all of which are spatially modulated are superposed on each other. The light composed of the R-light, the G-light and the B-light passes through the projection lens 15 and is projected on the screen 20, so that an enlarged color picture 21 is displayed on the screen 20.

Figure 14:
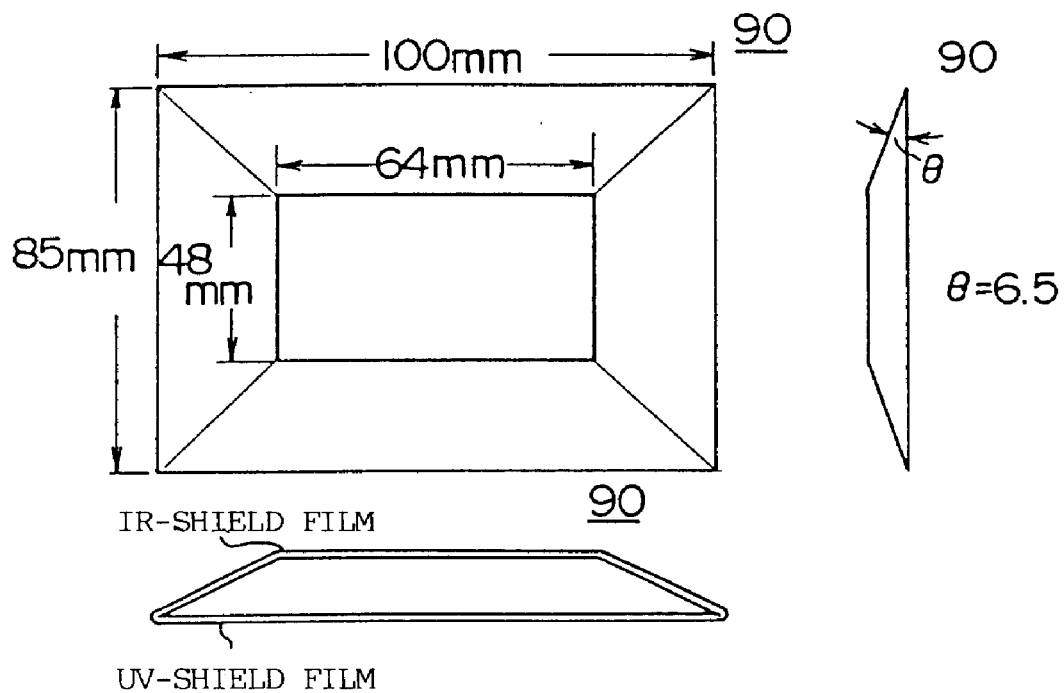
FIG. 14 is a diagram illustrating a detailed structure of the wedge prism assembly in the projection display apparatus shown in FIG. 13.

The wedge prism assembly 90 has the dimensions as shown in FIG. 14. The wedge prism assembly 90 is covered with the UV-shield film 38 and the IR-shield film 40. To prevent the respective components (the R-light, the G-light and the B-light) of the light reflected by and diverged from the fringe area of the parabolic reflector 12b from traveling out of the first, second and third liquid crystal light bulbs 101, 102 and 103, the wedge prism assembly 90 deflects the light from the light source unit 12 toward the optical axis. As a result, in the illuminance distribution formed on each of the first, second and third liquid crystal light bulbs 101, 102 and 103, the illuminance on the fringe area is increased in comparison with the illuminance in the conventional case.

The illuminance distribution of the picture 21 projected on the screen 20 corresponds to the illuminance distributions on the respective liquid crystal light bulbs 101, 102 and 103. Thus, in the illuminance distribution of the picture 21 formed on the screen 20, as shown by a curve X in FIG. 13, the illuminance on each area is increased in comparison with the curve I in the conventional case.

Figures 15A, 15B:
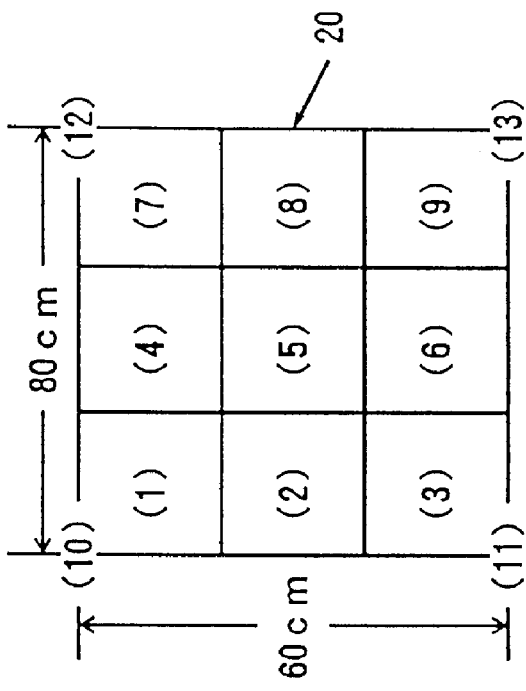
FIG. 15A is a table illustrating illuminance values which are measured on the screen.
FIG. 15B is a diagram illustrating areas on the screen on which the illuminance values are to be measured.

FIG. 15A indicates the measurement results of the illuminance on various areas of the picture 21 projected on the screen 20 by the projection display apparatus 100. Each of the first, second and third liquid crystal light bulbs 101, 102 and 103 has a diagonal dimension of 3.2 inches. The output power of the metal halide lamp 12a of the light source unit 12 is 250 watts. The wedge prism assembly 90 has the dimensions shown in FIG. 14. The areas on which the illuminance is measured are shown in FIG. 15B. The screen 20 is 60 centimeters (cm) long by 80 centimeters (cm) broad. The screen 20 is divided into nine areas (1) through (9).

The illuminance was measured at the center of each of the areas (1) through (9) and at four corners (10) through (13) of the screen 20. As indicated in FIG. 15A, a measured value of the illuminance on the area (5) located at the center of the screen 20 was 1687 lux (Lx). The average of measured values of the illuminance on the areas (1) through (4) and (6) through (9) was 849 lux (Lx), and the average of measured values of the illuminance at the corners (10) through (13) was 468 lux (Lx).

Comparing of the above measurement results with measurement results obtained in the conventional case shows the following (see FIG. 15A).

1) On all the areas (1) through (9) and the corners (10) through (13), the illuminance is greater than the corresponding illuminance in the conventional case.

2) On the area (5) at the center of the screen 20, the illuminance is 1.10 times as great as the corresponding illuminance in the conventional case. On the other areas (1) through (4) and (6) through (9), the illuminance is 1.27 times as great as the corresponding illuminance in the conventional case. On the corners (10) through (13) of the screen 20, the illuminance is 1.26 times as great as the corresponding illuminance in the conventional case. Thus, a rate (1.27) of the illuminance on the areas (1) through (4) and (6) through (9) to the corresponding illuminance in the conventional case is greater than a rate (1.10) of the illuminance on the area (5) at the center of the screen 20 to the corresponding illuminance in the conventional case. Further, a rate (1.26) of the illuminance on the corners (10) through (13) of the screen to the corresponding illuminance in the conventional case is greater than the rate (1.10) of the illuminance on the area (5) at the center of the screen 20 to the corresponding illuminance in the conventional case.

In the conventional case, a rate of the illuminance on the areas (2) through (4) and (6) through (9) to the illuminance on the area (5) at the center of the screen 20 is about 0.5 (849÷1687). A rate of the illuminance on the corners (10) through (13) of the screen 20 to the illuminance on the area (5) at the center of the screen 20 is about 0.28 (468÷1687).

In the case of the third embodiment as shown in FIG. 13, a rate of the illuminance on the areas (2) through (4) and (6) through (9) to the illuminance on the area (5) at the center of the screen 20 is about 0.58 (1082÷1864). A rate of the illuminance on the corners (10) through (13) of the screen 20 to the illuminance on the area (5) at the center of the screen 20 is about 0.31 (588÷1864).

Thus, in the third embodiment, the rate of the illuminance on the fringe portions (including the areas (2) through (4) and (6) through (9) and the corners (10) through (13)) of the screen 20 to the illuminance on the center portion (including the area (5)) of the screen 20 is greater than a corresponding rate in the conventional case. As a result, it seems that the illuminance on the fringe portions of the screen 20 is particularly increased in comparison with that in the conventional case. Thus, the picture 21 having a high quality (uniform brightness) is projected on the screen 20.

A description will now be given of a fourth embodiment of the present invention.

Figure 16:
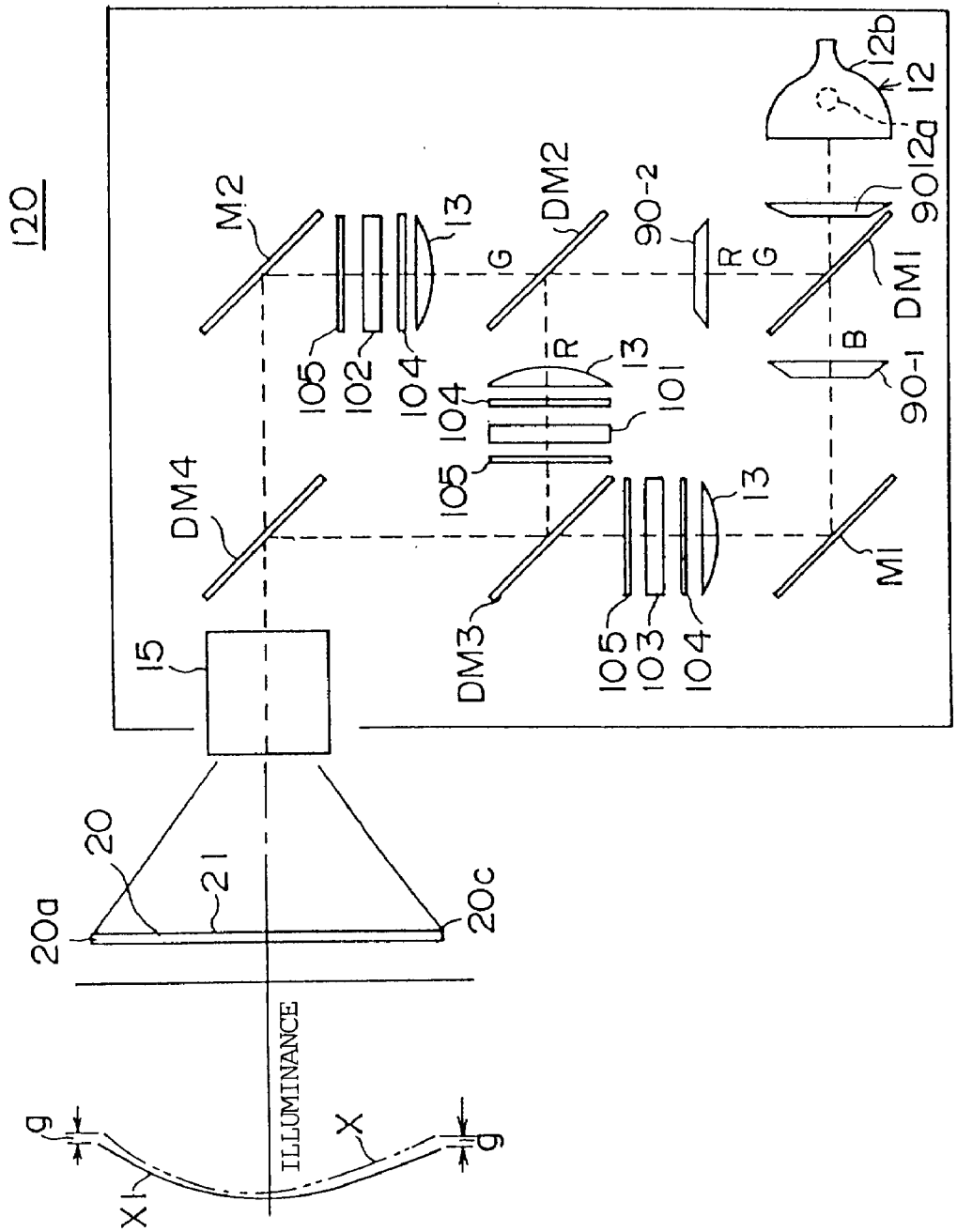
FIG. 16 is a diagram illustrating a projection display apparatus according to a fourth embodiment of the present invention.

A projection display apparatus according to the fourth embodiment of the present invention is formed as shown in FIG. 16. In FIG. 16, those parts which are the same as those shown in FIG. 13 are given the same reference numbers.

Referring to FIG. 16, a projection display apparatus 120 has a structure in which wedge prism assemblies 90-1 and 90-2 are added to the structure of the projection display apparatus 100 shown in FIG. 13. Each of the wedge prism assemblies 90-1 and 90-2 has almost the same structure as the wedge prism assembly 31. The wedge prism assembly 90-1 is located between the first dichroic mirror DM1 and the mirror M1, and the wedge prism assembly 90-2 is located between the first dichroic mirror DM1 and the second dichroic mirror DM2. Each of the wedge prism assemblies 90-1 and 90-2 functions in the same manner as the wedge prism assembly 81 shown in FIG. 9. The first dichroic mirror DM1 separates B-light beams from light reflected by a portion near the center of the parabolic reflector 12b. Then, to prevent the B-light beams from traveling out of the third liquid crystal light bulb 103, the wedge prism assembly 90-1 deflects the B-light beams toward the optical axis. The first and second dichroic mirrors DM1 and DM2 separates R-light beams and G-light beams from the light reflected by the portion near the center of the parabolic reflector 12b. Then, to prevent the R-light beams and the G-light beams from respectively traveling out of the first and second liquid crystal bulbs 101 and 102, the wedge prism assembly 90-2 deflects the R-light beams and the G-light beams toward the optical axis.

Accordingly, in each of the illuminance distributions formed on the respective liquid crystal light bulbs 101, 102 and 103, the illuminance on the fringe portion is further increased. Thus, in the illuminance distribution of the picture 21 on the screen 20, as shown by a curve XI in FIG. 16, the illuminance on the fringe portion near the edges 20a and 20c of the screen 20 is increased by "f". Thus, the picture 21 having an increased high quality is projected on the screen 20.

Each of the wedge prism assemblies described above is not limited to a rectangle. The wedge prism assembly may have a structure in which wedge prisms are arranged in, for example, a hexagonal form. The vertical angle of each of the wedge prisms depends on the structure of the projection display apparatus, and may fall within a range between 3 degrees and 13 degrees.

A reflection-type screen and a transmission-type screen may be used as the screen 20 on which the picture 21 should be projected.

A halogen lamp may be substituted for the metal halide lamp 12a.

The manner in which the wedge prims assembly is covered with the UV-shield film, the IR-shield film and the antireflection film is not limited to the above described embodiment. Both sides of the wedge prism assembly may be covered with all the UV-shield film, the IR-shield film and the antireflection film. A surface of the wedge prism assembly may be covered with UV-shield film and an opposite surface thereof may be covered with the antireflection film.

The present invention is not limited to the aforementioned embodiments, and other variations and modifications may be made without departing from the scope of the claimed invention.

What is claimed is:

1. A projection display apparatus comprising:
   a light source unit for emitting light;
   a modulation member for spatially modulating the light from said light source unit;
   a projection lens for projecting the light spatially modulated by said modulation member on a screen so that a picture corresponding to spatial modulation in said modulation member is formed on said screen; and
   a deflection member, located between said light source and said modulation member, for deflecting beams in a fringe of the light emitted from said light source unit toward an optical axis and onto said modulation member, said deflection member having a first plane surface on which the beams are incident and a second plane surface from which the beams are emitted so that beams are deflected without converging the beams to a predetermined location to prevent the beams from traveling past said modulation member.

2. The projection display apparatus as claimed in claim 1, wherein said deflection member has a plurality of deflection units, each deflection unit deflecting the beams toward the optical axis.

3. The projection display apparatus as claimed in claim 2, wherein a deflection unit includes a prism which deflects the beams toward the optical axis.

4. The projection display apparatus as claimed in claim 2, wherein a deflection unit is covered with at least one of an ultraviolet-shield film, an infrared-shield film and an anti-reflection film.

5. The projection display apparatus as claimed in claim 2, wherein a deflection unit includes a prism assembly in which a plurality of prisms are arranged in a polygonal form.

6. The projection display apparatus as claimed in claim 5, wherein a deflection unit includes a prism assembly which is integrally made of a material so that a plurality of prisms are arranged in a polygonal form.

7. The projection display apparatus as claimed in claim 5, wherein said prism assembly is covered with an ultraviolet-shield film and an infrared-shield film.

8. The projection display apparatus as claimed in claim 1, wherein said modulation member has a liquid crystal light bulb on which a pattern corresponding to the picture to be projected on said screen is displayed.

9. A projection display apparatus, comprising:

a light source unit for emitting light;

a modulation member for modulating light emitted from said light source unit;

a condenser for condensing light emitted from said light source unit through said modulation member to a projection lens; and a deflection member, located between said light source unit and said condenser, for deflecting beams in a fringe of light emitted from said light source unit to said condenser, said deflection member having a first plane surface on which the beams are incident and a second plane surface from which the beams are emitted so that beams are deflected without converging the beams to a predetermined location to prevent the beams from traveling out of said modulation member.

* * * * *